US009908791B2

(12) United States Patent
Capan

(10) Patent No.: US 9,908,791 B2
(45) Date of Patent: Mar. 6, 2018

(54) STEAM CONDENSATION AND WATER DISTILLATION SYSTEM

(71) Applicant: HSE HITIT SOLAR ENERJI A.S., Istanbul (TR)

(72) Inventor: Rahmi Oguz Capan, Mugla (TR)

(73) Assignee: HSE HITIT SOLAR ENERJI SIRKETI, Istanbul (TR)

( * ) Notice: Subject to any disclaimer, the term of this patent is extended or adjusted under 35 U.S.C. 154(b) by 702 days.

(21) Appl. No.: 14/465,662

(22) Filed: Aug. 21, 2014

(65) Prior Publication Data
US 2014/0360857 A1    Dec. 11, 2014

Related U.S. Application Data

(63) Continuation of application No. PCT/EP2012/069105, filed on Sep. 27, 2012.

(30) Foreign Application Priority Data

Sep. 7, 2012    (TR) ................. a 2012 10250

(51) Int. Cl.
| | |
|---|---|
| C02F 1/16 | (2006.01) |
| C02F 1/48 | (2006.01) |
| C02F 1/04 | (2006.01) |
| B01D 5/00 | (2006.01) |
| B01D 3/10 | (2006.01) |

(52) U.S. Cl.
CPC ............... *C02F 1/16* (2013.01); *B01D 3/103* (2013.01); *B01D 5/006* (2013.01); *B01D 5/0045* (2013.01);
(Continued)

(58) Field of Classification Search
CPC .... B01D 3/103; B01D 5/0048; B01D 1/0058; B01D 1/0064; B01D 1/02; B01D 1/04;
(Continued)

(56) References Cited

U.S. PATENT DOCUMENTS 3,725,206 A  *  4/1973  Foley ................. C02F 1/04
                                                                 159/16.1
4,444,623 A  *  4/1984  Youngner ............... B01D 3/10
                                                                  202/181
(Continued)

FOREIGN PATENT DOCUMENTS

DE      21 38 822 A1    3/1973
DE      31 31 882 A1    2/1983
(Continued)

OTHER PUBLICATIONS

International Search Report and Written Opinion dated May 22, 2013, pp. 1-7, International Application No. PCT/EP2012/069079, European Patent Office, Rijswijk, The Netherlands.
(Continued)

*Primary Examiner* — Bobby Ramdhanie
*Assistant Examiner* — Briana M Obenhuber
(74) *Attorney, Agent, or Firm* — Brinks Gilson & Lione

(57) ABSTRACT

The steam condensation and water distillation system including a first part having an evaporation compartment in which water received from a water source is evaporated and which has a vacuum environment and a first column in which high density water is accumulated; a steam line passing through the evaporation compartment; a condensation pool; a second part having a condensation compartment in which the steam is transferred and which has a vacuum environment, a second column to receive distilled water formed by the condensation of the steam, and a distilled water compartment positioned in the condensation compartment and having clean water; a first distilled water line in connection with the distilled water compartment and the second column; and a second distilled water line by which distilled water is transferred for utilization.

24 Claims, 1 Drawing Sheet

(52) U.S. Cl.
CPC ............ *B01D 5/0048* (2013.01); *C02F 1/046* (2013.01); *C02F 1/048* (2013.01)

(58) Field of Classification Search
CPC ... B01D 1/06; B01D 3/10; B01D 3/02; B01D 5/00; B01D 5/006; B01D 5/0045; B01D 5/0003; B01D 5/0006; B01D 5/0009; B01D 5/0012; B01D 5/009; B01D 5/0051; C02F 1/00; C02F 1/04; C02F 1/046; C02F 1/048; C02F 1/16; C02F 2209/42; C02F 2301/063; C02F 2103/08
See application file for complete search history.

(56) References Cited

U.S. PATENT DOCUMENTS

| | | | | |
|---|---|---|---|---|
| 5,242,548 | A | * | 9/1993 | Youngner ................ B01D 3/10 159/901 |
| 5,441,606 | A | * | 8/1995 | Schlesinger ......... B01D 1/0017 202/176 |
| 2006/0231379 | A1 | * | 10/2006 | Raviv .................. B01D 5/0036 202/205 |
| 2009/0077969 | A1 | | 3/2009 | Prueitt |
| 2010/0065414 | A1 | * | 3/2010 | Rautenbach ......... B01D 1/0017 202/167 |

FOREIGN PATENT DOCUMENTS

| | | |
|---|---|---|
| WO | WO 2007/006323 A1 | 1/2007 |
| WO | WO 2010/059810 A2 | 5/2010 |
| WO | WO 2011/098478 A1 | 8/2011 |

OTHER PUBLICATIONS

International Search Report and Written Opinion, dated Jul. 3, 2013, pp. 1-10, International Application No. PCT/EP2012/069105, European Patent Office, Rijswijk, The Netherlands.

* cited by examiner

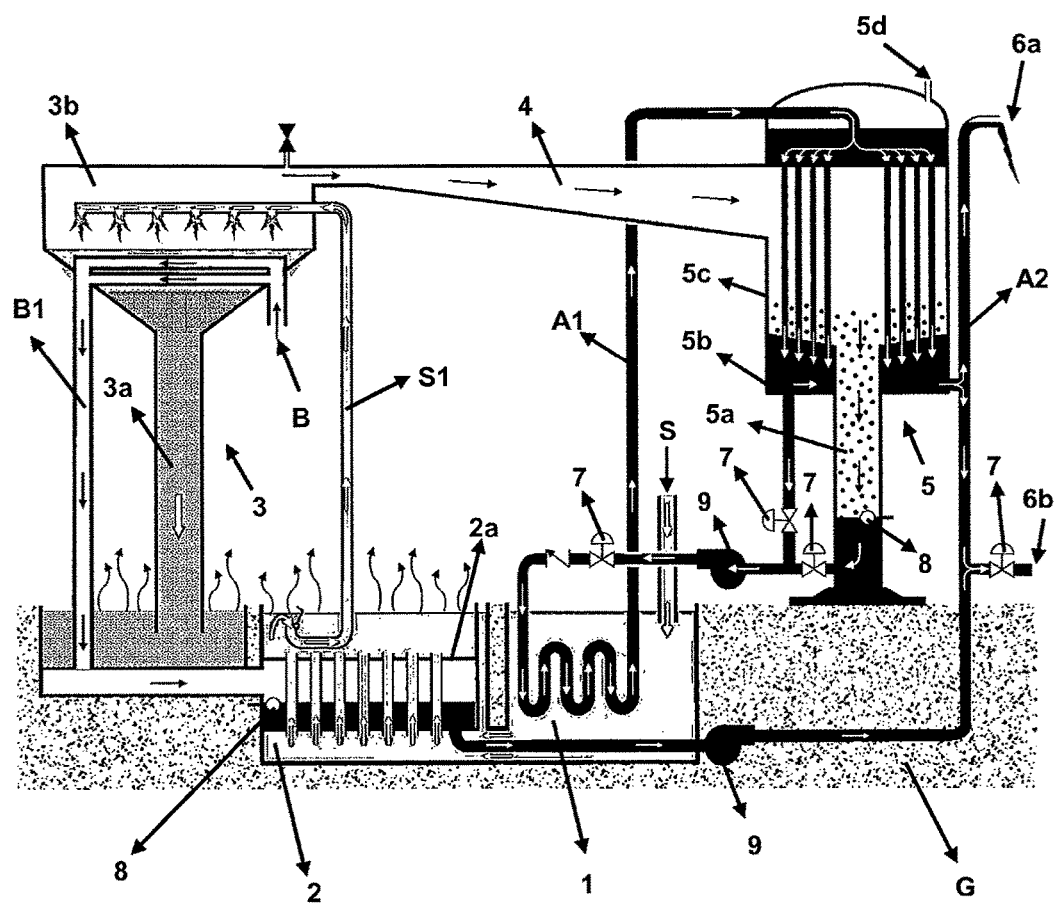

STEAM CONDENSATION AND WATER DISTILLATION SYSTEM

CROSS-REFERENCE TO RELATED APPLICATION

In accordance with 35 U.S.C. § 111(a), this application is a continuation of International Application PCT/EP2012/069105, with an international filing date of Sep. 27, 2012, and claims all benefits of said international application. A copy of this international application is included herewith.

TECHNICAL FIELD

The present invention is related to a system which condenses steam/steam comprising waste heat while distilling high density water such as brine, lake water, river water, etc. for using in daily life by using this steam at the same time.

PRIOR ART

Although most of the world is formed by water, water available to be used for personal usage (cleaning, drinking, etc.) decreases day by day. Therefore, using different water sources by being distilled gains importance especially in recent years. Water distillation process is performed basically by evaporating high density water such as brine comprising salt and similar foreign substances preferably via heating, and liquefying evaporated water by cooling again.

In the state of the art, various methods are used for distilling high density water. For instance the patent document no WO2007006323A1 of the state of the art discloses a system for distilling brine by using vacuum and energy in low amount. In said system, brine is provided in two columns which are connected each other from upwards so as to form a vacuum in the upper part of the columns. When one of the columns is energized, the water inside the column is energized and distillation is performed by condensing steam in the other column. However in said system, extra energy is needed to be consumed for heating a column and cooling the other column.

BRIEF DESCRIPTION OF THE INVENTION

The steam condensation and water distillation system of the present invention comprises a first part comprising at least one evaporation compartment in which water received from a water source is transferred by at least one water transfer line and is evaporated after being accumulated therein and in which a vacuum environment is provided; and at least one first column in which high density water, whose concentration is extremely high after the evaporation, is accumulated and which is connected to the evaporation compartment; at least one steam line at least one part of which is located in the evaporation compartment and at least one side of which is provided with at least one steam inlet connected to a steam resource formed in a power plant and/or industrial facility; at least one condensation pool in which steam passing through the steam line is transferred, which is positioned inside the water source, and which ensures condensation of the steam via cold water inside the water source; at least one second part which comprises at least one condensation compartment in which steam obtained in the evaporation compartment is transferred and in which steam is begun to be condensed and which is provided with a vacuum environment, at least one second column which is in connection with the condensation compartment and in which a mixture of distilled water, obtained by the condensation of the steam, and steam, to be condensed, are accumulated, and at least one distilled water compartment which is in connection with the second column, which is provided with an amount of clean water during the first operation of the system therein, in which the condensation compartment is positioned, and in which distilled water coming from the second column is accumulated; at least one first distilled water line one end of which is connected to the distilled water compartment and the other end of which is connected to the part of the second column where the distilled water is accumulated, another end of which is connected to the distilled water compartment for transferring distilled water coming from the distilled water compartment and the second column by being cooled to the distilled water compartment again; at least one second distilled water line which is in connection with the condensation pool such that at least one side of which is inside the water source, which comprises at least one first distilled water outlet by which distilled water is transferred for using and which is at or under the level of the distilled water accumulated in the distilled water compartment, and at least one second distilled water outlet by which distilled water is transferred to the power plant and/or facility for re-use, at least one another part of the second distilled water line is in connection with the distilled water compartment, and directs water coming from the compartment to both of the water outlets. Thanks to the steam condensation and water distillation system of the present invention, the condensation of the steam comprising the waste heat obtained from a power plant and/or industrial facility is performed by using the water to be distilled; distillation of the water taken from a water source (e.g. from sea) for daily use is able to be performed by the steam taken from the power plant and/or industrial facility at the same time. Thus expensive systems used for distillation and for the condensation of the waste steam are not needed, and realization of distillation and condensation processes without needing external energy is able to be ensured.

Objectives of the Invention

An aim of the invention is to develop a system which performs the processes of both condensing steam or steam comprising waste heat and distilling water at the same time.

The other aim of the invention is to develop a system in which water distillation process is performed by using steam comprising waste heat occurred especially in power plants and/or industrial facilities while condensing this steam for re-using at the same time.

Another aim of the invention is to perform an efficient water distillation process.

Yet a further aim of the invention is to develop a steam condensation and water distillation system which is cost effective and easy to use.

DESCRIPTION OF THE DRAWINGS

An exemplary embodiment of the present invention is shown in attached drawing wherein;

FIG. 1 is a schematic view of the steam condensation and water distillation system and of the operation of this system.

The parts in the FIGURE are individually enumerated and the corresponding terms of reference numbers are given as follows:

First distilled water line (A1)
Second distilled water line (A2)

Steam inlet (B)
Steam line (B1)
Ground (G)
Water inlet (S)
Water transfer line (S1)
First pool (1)
Second pool (2)
Condensation pool (2a)
First part (3)
First column (3a)
Evaporation compartment (3b)
Connection line (4)
Second part (5)
Second column (5a)
Distilled water compartment (5b)
Condensation compartment (5c)
Opening (5d)
First distilled water outlet (6a)
Second distilled water outlet (6b)
Control valve (7)
Level controlling element (8)
Pump (9)

DESCRIPTION OF THE INVENTION

Especially in power plants and/or industrial facilities, steam comprising waste heat is formed during the operation of power plants and/or industrial facilities. By condensing this steam via various applications, re-use of the steam is ensured. However, these condensing systems are both expensive and inefficient. Recently, clean and usable water demand is considerably increased and clean water resources have critically decreased. Therefore, high density waters such as brine, well water, river water, etc. which cannot be used in directly may be able to be used by being distilled. However, for this distillation processes, expensive systems such as reverse osmosis systems are used and thus distillation process cannot become sufficiently widespread. Thus, the present disclosure describes a steam condensation and water distillation system which is able to perform both of the processes (both steam condensation and water distillation) at the same time.

The steam condensation and water distillation system, whose exemplary schematic view is shown in FIG. 1, comprises a first part (3) comprising an evaporation compartment (3b) in which water received from a water source such as sea, lake, or well etc. is transferred by at least one water transfer line (S1) and is evaporated after being accumulated therein and in which a vacuum environment is provided, and at least one first column (3a) in which high density water (this water comprises foreign substances in extremely high concentrations such as brine or high mineral water), having extremely high concentration after the evaporation, is accumulated and which is connected to the evaporation compartment (3b); at least one steam line (B1) at least one part of which is located in a part of the evaporation compartment (3b) preferably where water to be evaporated is accumulated and at least one side of which is provided with at least one steam inlet (B) connected to a steam resource (this steam resource is a steam which is formed preferably in power plants and/or industrial facilities and comprises waste heat); at least one condensation pool (2a) in which steam passing through the steam line (B1) is transferred, which is positioned inside the water source, and which ensures condensation of the steam via cold (having lower temperature than the temperature of the steam) water inside the water source; at least one second part (5) which comprises at least one condensation compartment (5c) in which steam obtained in the evaporation compartment (3b) is transferred via at least one connection line (4) provided preferably with a vacuum environment therein and in which steam is begun to be condensed and which is provided with a vacuum environment, at least one second column (5a) which is in connection with the condensation compartment (5c) and in which a mixture of distilled water, obtained by the condensation of the steam, and steam, to be condensed, are accumulated, and at least one distilled water compartment (5b) which is in connection with the second column (5a), which is provided with an amount of clean water (this clean water can be distilled water or soft water) during the start-up of the system therein, in which the condensation compartment (5c) is positioned, and in which distilled water coming from the second column (5a) is accumulated; at least one first distilled water line (A1) one end of which is connected to the distilled water compartment (5b) (preferably from the lower part of the distilled water compartment) and the other end of which is connected to the part of the second column (5a) in which the distilled water is accumulated, preferably at least one part of which is positioned inside the water source in order to cool the distilled water coming from distilled water compartment (5b) and second column (5a), another end of which is connected to the distilled water compartment (5b) (preferably from upper part of the distilled water compartment) for transferring cooled distilled water to the distilled water compartment (5b) again; at least one second distilled water line (A2) which is in connection with the condensation pool (2a) such that at least one side of which is inside the water source, which comprises at least one first distilled water outlet (6a) by which distilled water is transferred to e.g. main water and which is at or under the level of the distilled water accumulated in the distilled water compartment (5b), and at least one second distilled water outlet (6b) by which distilled water is transferred to the power plant and/or facility for re-use, at least another part of the second distilled water line (A2) is in connection with the distilled water compartment (5b) from the lower part, and directs water coming from the compartment (5b) to both of the water outlets (6a, 6b). With the system of the present invention, water taken from a water source (S) is transferred to the evaporation compartment (3b) in the first part (3) by means of the water transfer line (S1) whose end, into which the water coming from water source is passed, is provided with an open part which is preferably twisted such that said open part faces upwards. Thanks to the twisted end of the water transfer line (S1) inside the water source, gases are prevented from rising to the atmosphere and are passed to the water transfer line (S1) during the evaporation of the water inside the water source. The steam coming from the steam inlet (B) which is in connection with a steam outlet of a power plant and/or industrial facility evaporates the water coming to the evaporation compartment (3b) thanks to the fact that a part of the steam line (B1) is positioned in the evaporation compartment (3b). temperature of the steam decreases a little since a part of the preferably waste heat comprised by the steam is transferred to the water accumulated in the evaporation compartment (3b). Then, the steam which moves forward in the steam line (B1) and whose temperature is lowered reaches the condensation pool (2a) provided inside the water source. Since the condensation pool (2a) is provided inside the water source, the waste heat reaching to the condensation pool (2a) condenses by giving its heat to the water; and therefore distilled water is obtained from the steam coming from the power plant and/or industrial facility. While this process continues, the steam obtained in the evaporation compartment (3b) by the evaporation of water coming from the water source passes to the condensation compartment (5c) inside the second part (5). High density water whose concentration is extremely high and which is formed during this evaporation reaches to the first column (3a) in the first part (3) because of the high density and accumulates therein. Since there is initially an amount of water provided in the distilled water compartment (5b), the steam coming to the condensation compartment (5c) provided inside the distilled water compartment (5b) condenses, and accumulates as the distilled water in the second column (5a) in the second part (5). Then, the distilled water accumulated in the second column (5a) passes to the first distilled water line (A1). Thanks to the cooling of a part of the first distilled water line (A1), the distilled water losses little heat and thus cools down. The cooled distilled water moves forward in the first distilled water line (A1) and accumulates in the distilled water compartment (5b). Moreover, the distilled water accumulated in the distilled water compartment (5b) passes to a second distilled water line (A2) at the same time, and is directed to the water outlets (6a, 6b) therefrom. At the same time, the distilled water accumulated in the condensation pool (2a) and obtained from the steam coming from the power plant and/or facility passes to the second distilled water line (A2), and then returns for being re-used in the power plant and/or facility by being passed from the second distilled water outlet (6b). The distilled water taken from the first distilled water outlet (6a) is able to be transferred for instance to a water main for daily use. Therein, since the first distilled water outlet (6a) of the second distilled water line (A2) is at the same level with or under the distilled water accumulated in the distilled water compartment (5b), the distilled water taken from the first distilled water line (A1) stems from therein by itself without needing any other force. With the system of the present invention, there is no need for extremely expensive condensation systems used for condensing the steam formed in power plants and/or industrial facilities and costly systems used for distilling water taken from a water source for daily use separately. Therefore, while heat energy of the water coming from the water source is used for condensation of the steam, heat energy of the steam is used for the evaporation of the water coming from the water source at the same time. Therefore, in the system of the present invention, since the process of condensation of the steam and distillation of the water taken from the water source by evaporation is performed by using the energies of the steam and distilled water in the evaporation and condensation processes, both the cost and external energy consumption of the system are extremely low. Moreover, thanks to forming vacuum environment in the evaporation compartment (3b) and the condensation compartment (5c), both evaporation and condensation are performed easily; and a more efficient system is able to be obtained thanks to the fact that both the evaporation and the condensation are performed in low temperatures, and that the temperature difference between the temperature used for evaporation and the temperature used for condensation is much more than in the systems of the state of the art. Besides, since the system of the present invention is suitable for multi-stage applications, capacity of the system is able to be increased. In other words, more than one system may be connected to one another in series and a cooled part of the first distilled water line (A1) of the first system is passed through the evaporation compartment (3b) of the second system. Therefore while it is ensured that distilled water to be transferred to the distilled water compartment (5b) in the first system is cooled, it is ensured at the same time that the water taken to the evaporation compartment (3b) of the second system is evaporated. Thus; multi-staged application is ensured without using any external energy.

In a preferred embodiment of the present invention, by means of at least one water inlet (S), the water taken from the water source is accumulated in at least one first pool (1) which is in connection with the atmosphere from at least one side and which is positioned preferably under a ground (G). In this embodiment, for ensuring passage of the distilled water taken from the second column (5a) to the distilled water compartment (5b) in cool state, at least one part of the first distilled water line (A1) is positioned inside the first pool (1), where the water coming from the water source is accumulated, so as to be preferably in a curved structure (e.g. in "S" form). Therefore, thanks to the accumulation of the water taken from the water source firstly in the first pool (1) in connection with the atmosphere, aeration and degasification of the water before the evaporation are ensured. Moreover, preferably in this embodiment, the condensation pool (2a) and a part of the water transfer line (S1), in which water outlet is provided, are able to be positioned inside the first pool (1) and the second distilled water line (A2) is connected to the condensation pool (2a) by passing through the first pool (1). With this embodiment, efficient and effective usage of the system is ensured even if the system cannot be built in an area close to a water source.

In a preferred embodiment of the invention shown in the FIGURE, nozzles are provided in a part of the water transfer line (S1) located inside the evaporation compartment (3b), and water coming from the water source (S) is sprayed to the evaporation compartment (3b) by means of these nozzles. Said spraying process is performed with the effect of the vacuum provided in the system without using any pump. Therefore, it is ensured that the water coming from the water source to the evaporation compartment (3b) is easily evaporated quickly and with less energy.

In another exemplary embodiment of the invention, the steam condensation and water distillation system comprises at least one second pool (2) which is in connection with the first pool (1) and positioned preferably under said ground (G), and at least one side of which is in connection with the atmosphere. In this embodiment, while a part of the first distilled water line (A1) remains inside the first pool (1), the condensation pool (2a) and the water inlet part of the water transfer line (S1) remain in the second pool (2). The water coming from the water inlet (S) passes firstly to the first pool (1) and then to the second pool (2). Therefore during cooling of the water passing through the first distilled water line (A1) in the first pool (1), the heat given to the water accumulated in the first pool (1) does not affect the water accumulated in the second pool (2); and thus a negative thermal effect on the steam condensation via the water in the second pool (2) is able to be prevented. Similarly, in the second pool (2), during the condensation of the steam accumulated in the condensation pool (2a), the heat given to the water accumulated in the second pool (2) does not affect the water accumulated in the first pool (1); therefore it can be ensured that both of the processes are performed effectively without being affected from each other.

The steam condensation and water distillation system, which is developed in another alternative embodiment of the invention, comprises at least one level controlling element (8) which is positioned in the condensation pool (2a). The level control element (8) located in the condensation pool (2a) is in connection with at least one pump (9) positioned in the part of the second distilled water line (A2) preferably remaining outside the first pool (1); and when the water accumulated in the condensation pool (2a) exceeds a certain level, quick transfer of the obtained distilled water to the distilled water outlets (6a, 6b) is ensured. Therefore, passage of the water accumulated in the condensation pool (2a) to the steam line (B1) is able to be prevented.

The steam condensation and water distillation system, which is developed in another exemplary embodiment of the invention, comprises another level controlling element (8) positioned in the second column (5a). This level controlling element (8) is in connection with at least one control valve (7) positioned in the first distilled water line (A1); and when the distilled water accumulated in the second column (2a) exceeds a certain level, an amount of water accumulated in the second column (5a) is drawn from the second column (5a) by means of the control valve (7); therefore exceeding of the water the limit level necessary for proper operation of the system of the invention is able to be prevented. Thus; the width of the vacuum area formed in the system can be maintained at a width which is necessary for the effective operation of the system, and increasing the efficiency of the system. The system developed by this embodiment preferably comprises at least three control valves (7) at least one of which is positioned where the first distilled water line (A1) is in connection with the second column (5a), at least one of which is positioned where water is passed from the distilled water compartment (5b) to the first distilled water line (A1); and at least one of which is positioned where the first distilled water line (A1) enters into the water source or the first pool (1). Therefore effective controlling of the water level in the second column (5a) is ensured.

The steam condensation and water distillation system, which is developed in another alternative embodiment of the invention, comprises another controlling valve (7) positioned in the second distilled water outlet (6b). Therefore, since the water to be transferred to the power plant and/or facility has to be in a certain flow rate, regulation of the flow rate of the water taken from this outlet (6b) is able to be ensured.

In another alternative embodiment of the system of the present invention, the part of the evaporation compartment (3b) which is in connection with the first column (3a) is in the structure of a funnel; and this funnel shaped part ensures easy passage of the high density water formed after the evaporation to the first column (3a) and increases of the evaporation surface by means of remaining of the water to be evaporated at the upper side of the high density water.

In another preferred embodiment of the invention, an insulation element is positioned around the evaporation compartment (3b) and the water transfer line (S1). Therefore, an efficient system is developed by preventing effects of the external environment conditions on the evaporation compartment (3b) and the water transfer line (S1).

In another alternative embodiment of the invention, the system comprises at least one opening (5d) which is provided in the distilled water compartment (5b) and ensures connection of the compartment (5b) with the atmosphere. Thanks to this opening (5d), the water level provided inside the distilled water compartment (5b) is balanced. Moreover, it can be ensured that the pump (9) used for discharging water from the compartment (5b) is at a low capacity. Besides, the pressure inside this compartment (5b) is reduced, and therefore the cost of the compartment (5b) can be reduced. In addition to these, water which is more suitable for usage is able to be obtained by ensuring aeration and degasification of the distilled water accumulated in the distilled water compartment (5b) once again.

Thanks to the steam condensation and water distillation system of the present invention, while the condensation of the steam/the steam comprising the waste heat obtained from a power plant and/or industrial facility is performed by using the water to be distilled; distillation of the water taken from a water source (e.g. from sea) for daily use is able to be performed by the steam taken from the power plant and/or industrial facility. Thus expensive systems used both for distillation and for the condensation of the waste steam are not needed, and realization of distillation and condensation processes without needing an external energy is able to be ensured.

I claim:

1. A steam condensation and water distillation system comprising:
    a first part which comprises an evaporation compartment in which water received from a water source is transferred by a water transfer line and is evaporated after being accumulated therein and in which a vacuum environment is provided, and a first column in which high density water is accumulated and which is connected to the evaporation compartment;
    a steam line, a part of which is located in the evaporation compartment, and a side of which is provided with a steam inlet connectable to a steam resource which is formed in a power plant and/or an industrial facility;
    at least one condensation pool in which steam passing through the steam line is transferred, which is positioned inside the water source, to condense the steam via cold water inside the water source;
    at least one second part which comprises a condensation compartment in which steam obtained in the evaporation compartment is transferred and in which steam is condensed within a vacuum environment, a second column which is connected with the condensation compartment and in which a mixture of distilled water and steam are accumulated, and a distilled water compartment which is connected with the second column, which is provided with an amount of clean water during start-up of the system, in which the condensation compartment is positioned, and in which distilled water from the second column is accumulated;
    at least one first distilled water line, having a first end connected to the distilled water compartment, a second end connected to a part of the second column in which the distilled water is accumulated, and a third end also connected to the distilled water compartment to cool and recirculate the distilled water from the distilled water compartment and the second column through the distilled water compartment again; and
    at least one second distilled water line having a first inlet connected with the condensation pool such that a side of the second distilled water line is inside the water source, a first distilled water outlet, which is at or under a level of the distilled water accumulated in the distilled water compartment, and a second distilled water outlet by which distilled water is transferrable out for receipt by the power plant and/or industrial facility for re-use, and a second inlet connected with the distilled water compartment which directs water coming from the distilled water compartment to both the first distilled water outlet and the second distilled water outlet.

2. The steam condensation and water distillation system according to claim 1, wherein at least a part of the steam line located in the evaporation compartment is positioned in a part of the evaporation compartment where the water to be evaporated is accumulated.

3. The steam condensation and water distillation system according to claim 1, further comprising a connection line provided with a vacuum environment therein for the passage of steam formed in the evaporation compartment to the condensation compartment.

4. The steam condensation and water distillation system according to claim 1, wherein the first end of the first distilled water line is connected with the distilled water compartment at a lower part of the distilled water compartment.

5. The steam condensation and water distillation system according to claim 1, wherein the third end of the first distilled water line is connected with the distilled water compartment at an upper part of the distilled water compartment.

6. The steam condensation and water distillation system according to claim 1, wherein at least part of the first distilled water line is positioned inside the water source.

7. The steam condensation and water distillation system according to claim 1, wherein the second distilled water line is connected with the distilled water compartment at a lower part of the distilled water compartment.

8. The steam condensation and water distillation system according to claim 1, wherein an end of the water transfer line, into which the water from the water source is passed, is provided with an opening which faces upwards.

9. The steam condensation and water distillation system according to claim 1, further comprising a first pool in which the water taken from the water source, via a water inlet, is accumulated, wherein the first pool is in connection with the atmosphere from at least one side, and wherein a water inlet of the water transfer line is in fluid communication with the first pool.

10. The steam condensation and water distillation system according to claim 9, wherein the first pool is positioned underground.

11. The steam condensation and water distillation system according to claim 9, wherein at least one part of the first distilled water line is positioned inside the first pool.

12. The steam condensation and water distillation system according to claim 11, wherein the part of the first distilled water line inside the first pool is curved.

13. The steam condensation and water distillation system according to claim 9, wherein the condensation pool and the water inlet by which water enters into the water transfer line are positioned inside the first pool.

14. The steam condensation and water distillation system according to claim 9, wherein a part of the second distilled water line connected with the condensation pool passes through the first pool.

15. The steam condensation and water distillation system according to claim 1, further comprising a plurality of nozzles which are provided in a part of the water transfer line which is located inside the evaporation compartment, wherein the plurality of nozzles spray water coming from the water source to the evaporation compartment.

16. The steam condensation and water distillation system according to claim 9, further comprising a second pool connected with the first pool, in which the condensation pool and the water inlet of the water transfer line are positioned.

17. The steam condensation and water distillation system according to claim 16, wherein the second pool is positioned underground.

18. The steam condensation and water distillation system according to claim 1, further comprising a level controlling element which is positioned in the condensation pool and which controls level of the water in the condensation pool; and a pump which transfers the obtained distilled water to the first and second distilled water outlets when the water accumulated in the condensation pool exceeds a certain level.

19. The steam condensation and water distillation system according to claim 1, further comprising a level controlling element which is positioned in the second column, wherein the level controlling element is connected with a control valve positioned in the first distilled water line, and wherein the level controlling element causes an amount of water accumulated in the second column to be released from the second column by means of the control valve when the distilled water accumulated in the second column exceeds a certain level.

20. The steam condensation and water distillation system according to claim 19, further comprising a first control valve, a second control valve, and a third control valve, wherein at least one part of the first distilled water line is positioned inside the water source, wherein the first control valve is positioned where the first distilled water line is connected with the second column, wherein the second control valve is positioned where the distilled water compartment is connected to the first distilled water line; and wherein the third control valve is positioned where the first distilled water line enters into the water source.

21. The steam condensation and water distillation system according to claim 1, further comprising a control valve which is positioned in the second distilled water outlet.

22. The steam condensation and water distillation system according to claim 1, wherein a part of the evaporation compartment which is connected with the first column is a funnel.

23. The steam condensation and water distillation system according to claim 1, further comprising an insulation element which is positioned around the evaporation compartment and the water transfer line.

24. The steam condensation and water distillation system according to claim 1, further comprising an opening which is provided in the distilled water compartment, which is connected with the atmosphere.

* * * * *